US007774935B2

(12) United States Patent
Barbet et al.

(10) Patent No.: US 7,774,935 B2
(45) Date of Patent: Aug. 17, 2010

(54) METHOD OF MANUFACTURING AN ELECTRICALLY CONDUCTIVE ELEMENT

(75) Inventors: Vincent Barbet, La Roquette sur Siagne (FR); Paul Billon, Grasse (FR)

(73) Assignee: Thales, Neuilly sur Seine (FR)

(*) Notice: Subject to any disclaimer, the term of this patent is extended or adjusted under 35 U.S.C. 154(b) by 646 days.

(21) Appl. No.: 10/879,208

(22) Filed: Jun. 30, 2004

(65) Prior Publication Data

US 2005/0000084 A1 Jan. 6, 2005

(30) Foreign Application Priority Data

Jul. 1, 2003 (FR) .................................. 03 07942

(51) Int. Cl.
*H01R 43/02* (2006.01)
*H02K 13/00* (2006.01)

(52) U.S. Cl. ............................ 29/878; 29/854; 29/874; 29/877; 310/231; 310/232; 310/233

(58) Field of Classification Search .................. 29/825, 29/826, 854, 874, 877, 878; 310/231, 232, 310/233
See application file for complete search history.

(56) References Cited

U.S. PATENT DOCUMENTS 2,681,564 A * 6/1954 Jeromson, Jr. et al. . 73/862.338
2,835,866 A * 5/1958 Vradenburgh et. al. ...... 336/148
2,860,215 A * 11/1958 Williams ..................... 338/79
2,927,230 A * 3/1960 Guarnier ..................... 310/249
3,145,329 A 8/1964 Deakin
3,270,248 A 8/1966 Stanley

FOREIGN PATENT DOCUMENTS

| | | | |
|---|---|---|---|
| DE | 1 6313 183 | | 9/1971 |
| EP | 0 875 299 | A1 | 11/1998 |
| FR | 2 191 330 | | 2/1974 |
| JP | 05-056609 | A | 3/1993 |
| JP | 06-124615 | A | 5/1994 |
| JP | 2004-363152 | A | 12/2004 |

OTHER PUBLICATIONS

Motor Brush Wear Results for Air and Vacuum Operation by M.L. Christy paper in Aug. 7-10, 1984 onference, pp. 132-138 Am Soc Lubr. Engineers also ASLE Proc. 3$^{rd}$ Intr Conf on Solid Lubrication, 1984 (Denver).*
Nasa Technical Memorandum 208545 Research and Technology 1998 Annual Report John F. Kennedy Space Center.
DSP1 Stripping Pot, Item # AR1211.
L2AS Bench Wire Stripper, Item # AR2071.

* cited by examiner

*Primary Examiner*—C. J Arbes
(74) *Attorney, Agent, or Firm*—Sughrue Mion, PLLC

(57) ABSTRACT

The electrically-conductive element, in particular for a rotary collector, for transferring electrical current between two parts (2, 24) that are movable relative to each other is covered in one or more layers of electrically-insulating enamel (42), with the exception of an electrical continuity zone (43). The layer(s) of enamel (42) is/are removed, e.g. by chemical, thermal, or mechanical attack. The enamel (42) is selected from the group comprising: polyvinyls, polyurethanes, polyesters, polyester imides, polyamide imides, and polyimides. The layers may be the same or different in chemical nature.

19 Claims, 3 Drawing Sheets

FIG_1
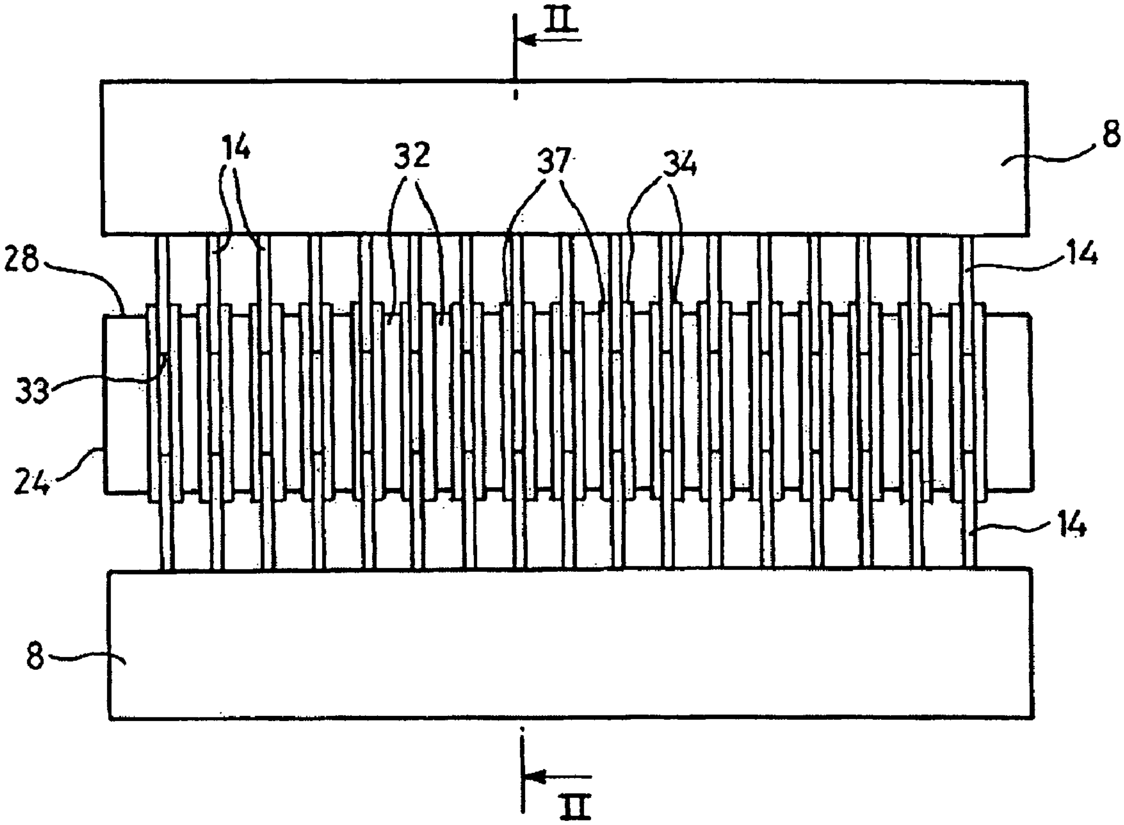
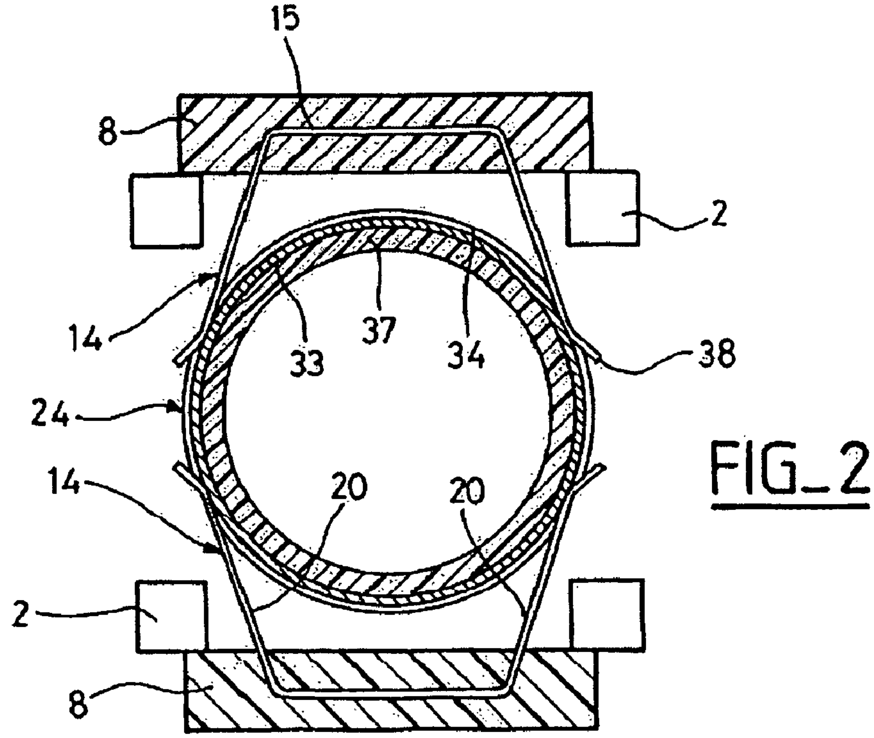
FIG_2

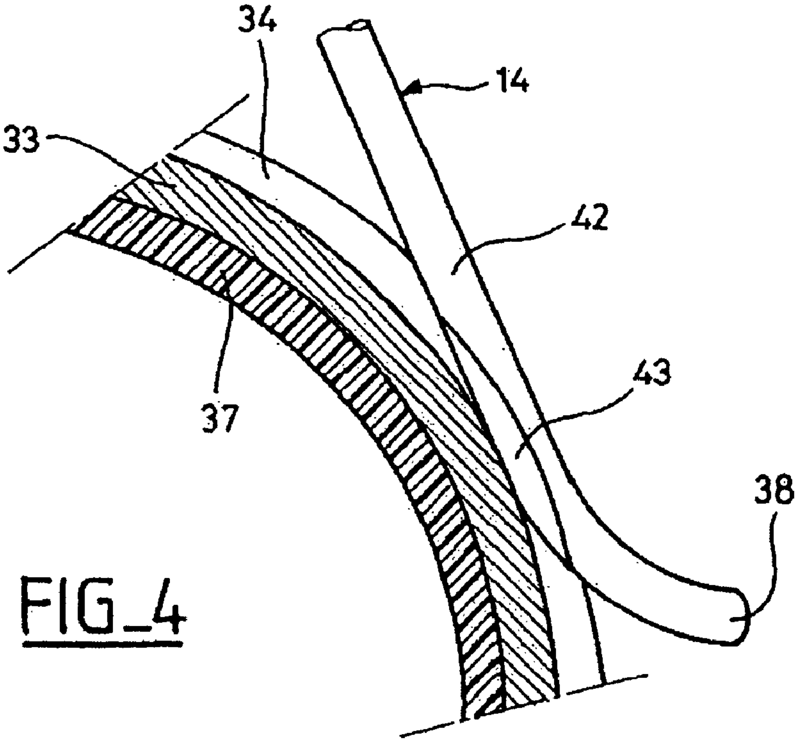
FIG_4
FIG_5
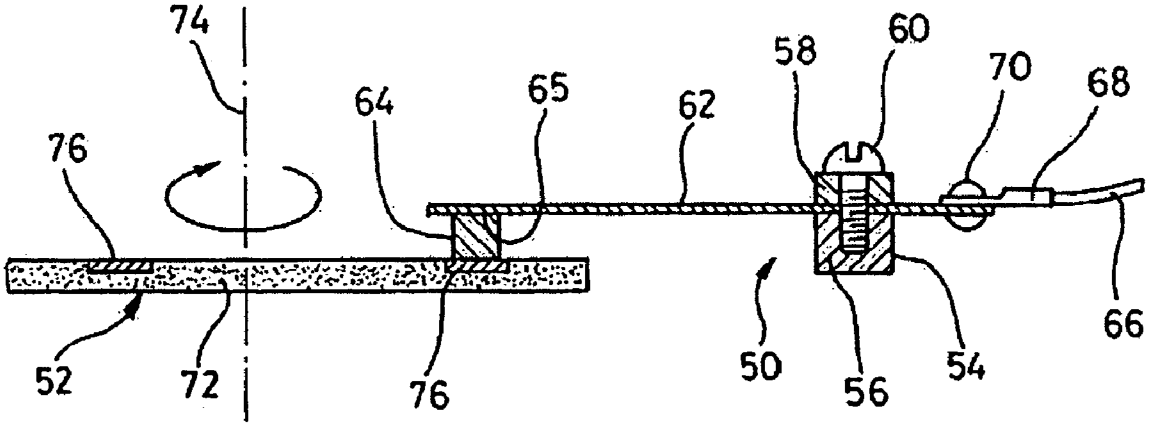

METHOD OF MANUFACTURING AN ELECTRICALLY CONDUCTIVE ELEMENT

The invention relates to a method of manufacturing insulated electrically-conductive elements of a rotary collector, and to a rotary collector for use in space and including such electrically-conductive elements.

Rotary collectors are used for transferring electrical power or signals between two parts that are movable relative to each other. In general, they comprise a fixed carrier structure referred to as a "stator" supporting conductor wires referred to as "wipers", and a rotary portion, the "rotor", carrying a plurality of cylindrical conductive tracks or "slip rings" with which the ends of the wipers are in electrical contact. The wipers and the tracks are connected to respective electrical conductors for conveying the power or the signals. The conductor wires or wipers are generally made of copper, gold, platinum, copper alloy, gold alloy, or platinum alloy.

In other types of collector, the power or the electrical signals are transferred from the fixed portion to the moving portion via brushes that rub against a cylindrical or plane conductive track. Such brushes are mounted on flexible brush supports.

The wipers and the brush supports constitute elements that are electrically-conductive in the meaning of the present invention. Given that they are conductive, they need to be insulated from one another. This insulation is presently achieved by spacing the wipers or the brush supports apart from one another. That solution presents the drawback of being sensitive to pollution by particles or by a conductive plasma which might lead to short circuits between adjacent wipers or brush supports. In the field of space to which the invention applies, such risks cannot be accepted because of the required level of reliability.

Document DE-1-613 183 describes resilient arms. Each arm has soldered to its end a pad in rubbing contact on a conductive track. The resilient element is constituted by the conductor itself which is surrounded by an insulating sheath of flexible synthetic material.

However, the presence of an insulating sheath of a certain thickness (usually about 100 micrometers (μm)) around the conductor disturbs the force with which the arm is pressed against the conductive track. In addition, when used in space, the insulating material must retain good mechanical strength at high temperature.

An object of the present invention is to provide a method of manufacturing insulated electrically-conductive elements, and in particular wipers and brush supports for a collector, and also a rotary collector including such wipers and/or brush supports, that remedy this drawback.

According to the invention, these objects are achieved by an electrically-conductive element for transferring an electrical current between two parts that are movable relative to each other. The electrically-conductive element is covered in at least one layer of electrically-insulating enamel, with the exception of an electrical continuity zone.

With a wiper, the electrical continuity zone is a friction zone for making contact with a conductive track that is movable relative thereto. For a brush support, the electrical continuity zone is a brush-mounting zone, which brushes come into contact with a conductive track that moves relative thereto.

According to the invention, the manufacturing method comprises the following steps:

a) covering said electrically-conductive element in one or more layers of electrically-insulating material;

b) baking said covered element so as to cure said material to form one or more layers of enamel; and c) treating the electrical continuity zone of each electrically-conductive element so as to remove the enamel layer(s) therefrom.

In a first variant implementation of the method, the electrically-conductive elements are mounted on a carrier structure of the collector after step c) of treating the electrical continuity zones.

In a second variant, the electrically-conductive elements are mounted on a carrier structure of the collector prior to step c) of treating the electrical continuity zones.

In a particular implementation, the enamel layer is removed by chemical, thermal, or mechanical attack. Advantageously, the enamel layer(s) is/are selected from the group comprising polyvinyls, polyurethanes, polyesters, polyester imides, polyamide imides, and polyimides.

The electrically conducive element may carry a plurality of layers of enamel that are identical or different in chemical nature.

The invention also provides a collector comprising first and second parts that are movable relative to each other, one of the parts supporting a plurality of electrically-conductive elements made by the method of the invention. Each electrically-conductive elements is covered in at least one layer of electrically-insulating enamel with the exception of an electrical continuity zone.

In a particular embodiment, the collector comprises a fixed carrier structure and a rotor with conductive tracks mounted to rotate in the carrier structure, the carrier structure supporting a plurality of electrically-conductive wipers, each having a contact zone pressed against a track of the rotor.

In another particular embodiment, the collector comprises a fixed carrier structure and a rotor with cylindrical or plane conductive tracks mounted to rotate in the carrier structure, the carrier structure supporting a plurality of electrically-conductive brush supports each having a zone for mounting brushes in contact with a track of the rotor.

Other characteristics and advantages of the present invention will appear further on reading the following description of embodiments given by way of non-limiting illustration and with reference to the accompanying drawings, in which:

FIG. 1 is an axial section view showing the general structure of a rotary collector;

FIG. 2 is a cross-section view on line II-II of FIG. 1;

FIG. 4 is a detail view on a larger scale showing the contact zone between a wiper in accordance with the invention and a track of the rotary collector of FIGS. 1 to 3; and FIG. 5 is a diagrammatic section view showing the general structure of another example of a rotary collector.

Figure 3:
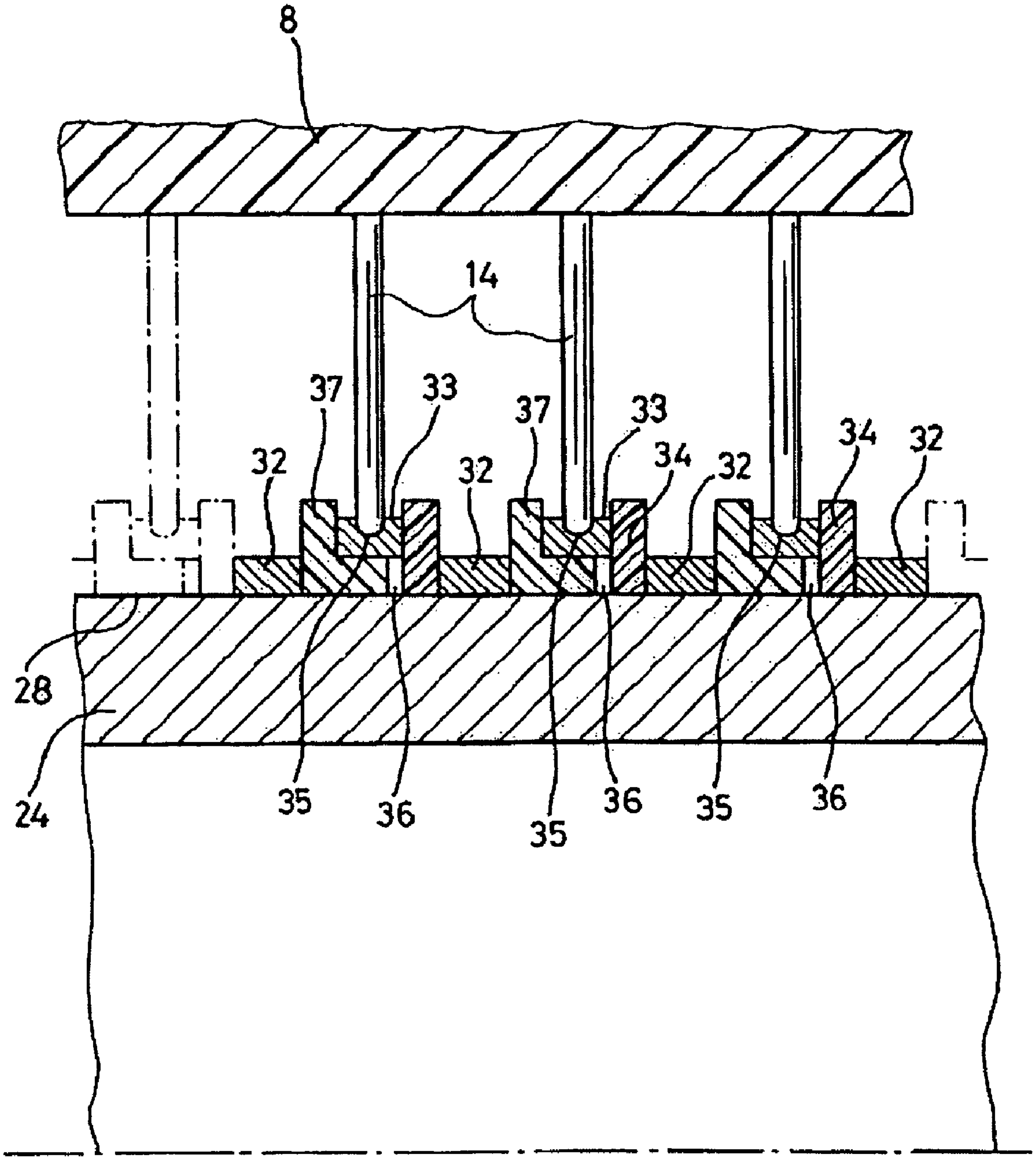
FIG. 3 is a fragmentary section view on a larger scale showing the tracks of the collector in FIGS. 1 and 2.

The collector shown in FIGS. 1 and 2 comprises a fixed carrier structure 2 supporting two wiper supports 8. Each wiper 14 comprises a plane portion 15 held in a wiper support 8 by a cover or by a resin fill, and two free ends 20 disposed on either side of the plane portion 15. The wipers are made of copper or copper alloy, or of some other metal that is a good conductor such as gold, silver, platinum, or an alloy thereof. In the present example, the wipers 14 are made of gold alloy and are circular in section. Nevertheless, in the context of the present invention, it should be understood that they could be of some other section, e.g. square, rectangular, or other. Each wiper support 8 is fixed, e.g. by means of screws (not shown) on two flats of the carrier support 2.

A rotor 24 is mounted to rotate inside the carrier structure 2. The rotor 24 is guided in rotation at its ends by bearings (not shown). It includes a carrier surface 28 having a series of rings engaged thereon. Some of the rings, such as the rings 32 and 34 (see FIG. 3) are merely spacers. Other rings 37 are of L-shape section and have the conductive rings 33 received therein. Clearance 36 is left between the rings 34 and 37 which are made of electrically-insulating material. A conductive ring 33, e.g. made of a copper alloy, of gold, or of gold-plated brass, is mounted on each ring 37. The rings 33 have respective grooves 35 of semicircular or other section to receive corresponding wipers 14. In addition, and as can be seen in FIG. 2, the ends 20 of the wipers have respective curved portions 38 for facilitating their insertion into the grooves 35. The wipers 14 are preloaded: that is to say their free ends 20 press against the tracks with a certain amount of "preloading" force so as to ensure good contact between the wipers and the tracks against which they are applied. The amount of preloading is adjustable.

FIG. 4 is a view on a larger scale showing the end of a wiper 14 in contact with a ring 33 of the rotor 24. In accordance with the invention, the surface of the wires constituting the wipers 14 is covered in one or more layers of enamel 42, with the exception of a zone 43 in rubbing contact against the ring 33.

The wipers are enameled prior to being used in the collector. This avoids polluting the collector. In addition, this enables them to be inspected before being used. The enameling operation may be performed by means of a known method, in particular by dipping the wipers in a solution of an electrically-insulating material, and then baking in an enameling oven, e.g. the oven described in document EP-0 875 299. The conductive wire for enameling travels continuously along an enameling line. The enameling line generally comprises an applicator for depositing onto the wire a solution comprising a solvent containing oligomers or prepolymers constituting the insulating material. Additives are commonly added to the solution (catalysts, bonding promoters, etc. . . . ). The applicator is followed by an enameling oven having a zone for evaporating off the solvents (150° C.-350° C.), and a zone for polymerizing and curing the electrically-insulating material (350° C.-550° C.). Once enameled, the conductive wire is subsequently cut up into segments to form the wipers 14. Each electrical continuity zone is treated to remove the enamel, e.g. by being dipped. The operation of removing the enamel is preferably performed after the wires 14 have been mounted in the carrier structure 2.

FIG. 5 shows a second embodiment of a collector in accordance with the invention. It comprises a fixed portion 50 and a moving portion 52. The fixed portion comprises a support 54, e.g. made of aluminum, made up of two portions 56 and 58 that are clamped together by a screw 60 and having disposed between them a brush support 62 that constitutes an electrically-conductive element in the meaning of the invention. The brush support 62 is constituted by a flexible electrically-conductive spring blade of flat, rectangular section and made, for example, of copper or of copper alloy. At its free end, it carries one or more brushes 64 made of carbon or of some other conductive material. At its other end, it is connected to an electrically-conductive wire 66 which is terminated by a crimp terminal 68 fixed to the spring blade 62, e.g. by means of a rivet 70. Insulation (not shown) is provided between the support 54 and the brush support 62.

The moving part 52 is constituted by a disk 72 movable in rotation about an axis 74. The disk 72 carries circular conducive tracks 76, e.g. made of silver. For simplification purposes, only one track and only one brush are shown in the figure, however in practice the collector will naturally comprise a plurality thereof, e.g. about ten. The brush 64 rubs against the track 76. The brush support 62 is preloaded so as to press the brush 64 with a given amount of force against the track 76.

In accordance with the invention, the flexible blade 62 is electrically insulated by one or more layers of enamel (not shown). These layers of enamel may be the same or different in chemical nature. They are advantageously deposited as a plurality of successive layers each having a thickness of a few micrometers. The layer of enamel is removed locally from the contact zone 65 between the brush 64 and the flexible blade 62 so as to ensure continuity of electrical transmission. The layer of enamel is also removed at the contact between the flexible blade 62 and the crimped terminal 68 of the electrical conductor 66.

The enamel used may be of polyvinyl, polyurethane, polyester, polyester imide, polyamide imide, polyimide, or other type.

The enamel is capable of withstanding high temperatures and strong differences of electrical potential. It bonds strongly to the wipers and/or the brush support. It is flexible and its thickness is small enough (10 μm to 15 μm) to:

- avoid disturbing the preloading of the wipers or the brush supports, i.e. the force with which the wipers or the brush supports are pressed against the conductive track; and
- be compatible with operations of shaping the wipers or the brush supports without leading to the enamel cracking.

The preloading is adjusted after the wipers or the brush supports have been enameled, so that the stiffness of the enamel is taken into account while adjusting the preloading.

Because of the presence of the layer of enamel 42, the wipers or the brush supports are doubly insulated in the power or signal collector. Firstly, as in the prior art, the wipers or brush supports are insulated by being spaced apart from one another, however, they are also insulated by the presence of a layer of enamel on each of them. Unlike other solutions, such as using insulating sheaths or a layer of adhesive, preloading is not disturbed by the presence of the layer of enamel. In addition, ability to withstand high temperatures is better than that of an adhesive or a sheath.

Finally, it should be understood that the invention does not apply exclusively to the rotary collectors described above, but to all types of collector in which conductor elements convey electrical signals or power by friction between a fixed part and a moving part, e.g. by friction on a track made on a disk or on a turntable. The invention also applies to a collector in which the tracks are stationary and the conductor elements are mounted on a part that rotates relative to the tracks.

What is claimed is:

1. A method of manufacturing an electrically-conductive element (14, 62) covered in at least one electrically-insulating layer (42) with the exception of an electrical continuity zone (43, 65) for transferring electrical contact between two parts (2, 24, 50, 52) that are movable relative to each other, the method being characterized in that it comprises the following steps:

a) covering said electrically-conductive element (14, 62) in one or more layers of electrically-insulating material;

b) baking said covered element so as to cure said material to form one or more layers of enamel (42); and c) treating the electrical continuity zone (43, 65) of each electrically-conductive element (14, 62) so as to remove the enamel layer(s) therefrom.

2. A method according to claim 1, in which said electrically-conductive elements (14, 62) are mounted on a fixed carrier structure (2, 50) of a rotary collector after step c) of treating the electrical continuity zones.

3. A method according to claim 1, in which said electrically-conductive elements (14, 62) are mounted on a fixed carrier structure (2, 50) of a rotary collector prior to step c) of treating the electrical continuity zones.

4. A method according to claim 1, in which the electrically-conductive elements are wipers (14), the electrical continuity zone being constituted by a zone (43) for rubbing against a conductive track (33, 35) which is movable relative thereto.

5. A method according to claim 1, in which the electrically-conductive elements are brush supports (62), the electrical continuity zone being constituted by a zone (65) for mounting brushes (64) on the brush support.

6. A method according to claim 1, in which the layer(s) of enamel is/are removed from the electrically conducive element (42, 62) by chemical, thermal, or mechanical attack.

7. A method according to claim 1, in which the enamel layer(s) (42) is/are selected from the group comprising polyvinyls, polyurethanes, polyesters, polyester imides, polyamide imides, and polyimides.

8. A method according to claim 1, in which the electrically conducive element carries a plurality of layers of enamel (42) of identical chemical nature.

9. A method according to claim 1, in which the electrically-conductive element carries a plurality of layers of enamel (42) of different chemical natures.

10. The method according to claim 1, further comprising the step of placing the electrical continuity zone in rubbing contact with a conductive track that is movable relative to the electrical continuity zone.

11. The method according to claim 1, further comprising the step of installing the electrically-conductive element in a stator of a rotary collector.

12. The method according to claim 1, wherein the enamel layer is removed from the electrical continuity zone by dipping the electrical continuity zone.

13. The method according to claim 12, wherein the electrical continuity zone is dipped so as to allow the enamel to remain on both sides of the electrical continuity zone.

14. The method according to claim 4, wherein the electrically-conductive element is curved at the location of the electrical continuity zone.

15. A method according to claim 4, wherein the wipers are mounted on a fixed carrier structure of a rotary collector and the conductive track is formed on a rotary portion of the rotary collector such that the conductive track is movable relative to the wipers.

16. A method according to claim 15, wherein the fixed carrier structure is a stator.

17. A method according to claim 4, wherein the wipers are insulated from each other by the enamel layer(s).

18. A method according to claim 5, wherein the brush supports are mounted on a fixed carrier structure of a rotary collector and a conductive track is formed on a rotary portion of the rotary collector such that the conductive track is movable relative to the brushes.

19. A method according to claim 5, wherein the brushes are mounted on the electrical continuity zone of the brush supports, and the brushes rub against a conductive track of a rotary portion of a rotary collector such that the conductive track is movable relative to the brushes.

* * * * *